(12) United States Patent
Williams et al.

(10) Patent No.: US 6,611,411 B2
(45) Date of Patent: Aug. 26, 2003

(54) TRIP SIGNAL VERIFYING METHOD AND APPARATUS

(75) Inventors: Craig B. Williams, Avon, CT (US); Michael S. Tignor, Watertown, CT (US); Michael B. Bradley, Farmington, CT (US)

(73) Assignee: General Electric Company, Schenectady, NY (US)

( * ) Notice: Subject to any disclaimer, the term of this patent is extended or adjusted under 35 U.S.C. 154(b) by 42 days.

(21) Appl. No.: 09/681,446

(22) Filed: Apr. 6, 2001

(65) Prior Publication Data

US 2002/0145841 A1 Oct. 10, 2002

(51) Int. Cl.$^7$ ................................................. H02H 3/28
(52) U.S. Cl. ...................................... 361/93.1; 700/292
(58) Field of Search .................. 361/93.1, 80, 45, 361/94, 68, 78, 85, 87, 97; 307/131; 700/292, 293

(56) References Cited

U.S. PATENT DOCUMENTS

| | | | | |
|---|---|---|---|---|
| 4,237,512 A | * | 12/1980 | Forford | 361/87 |
| 4,423,459 A | * | 12/1983 | Stich et al. | 361/94 |
| 4,502,086 A | * | 2/1985 | Ebisaka | 361/87 |
| 4,507,700 A | * | 3/1985 | Andow et al. | 700/293 |
| 4,653,052 A | * | 3/1987 | Doi et al. | 714/755 |
| 4,674,002 A | * | 6/1987 | Li et al. | 361/94 |
| 4,740,860 A | * | 4/1988 | Fornsel et al. | 700/293 |
| 4,761,706 A | * | 8/1988 | Fornsel | 700/293 |
| 5,027,276 A | | 6/1991 | Morishita et al. | 364/424.05 |
| 5,262,679 A | * | 11/1993 | Schweitzer et al. | 361/86 |
| 5,315,293 A | | 5/1994 | Kamiya | 361/94 |
| 5,511,223 A | * | 4/1996 | Scecina et al. | 700/292 |
| 5,559,719 A | * | 9/1996 | Johnson et al. | 700/293 |
| 5,699,222 A | | 12/1997 | Innes | 361/170 |
| 5,835,321 A | * | 11/1998 | Elms et al. | 700/293 |
| 5,974,545 A | | 10/1999 | Obermeier | 713/1 |
| 6,078,489 A | | 6/2000 | Messerli et al. | 361/87 |
| 6,147,847 A | * | 11/2000 | Hochgraef et al. | 361/93.1 |
| 6,175,780 B1 | * | 1/2001 | Engel | 700/293 |
| 6,282,499 B1 | * | 8/2001 | Andersen | 361/93.1 |
| 6,434,715 B1 | * | 8/2002 | Andersen | 361/93.1 |

* cited by examiner

Primary Examiner—Brian Sircus
Assistant Examiner—Roberto J. Rios
(74) Attorney, Agent, or Firm—Cantor Colburn LLP

(57) ABSTRACT

A verifying trip unit includes a microcontroller providing a plurality of input signals to a logic device for controlling a trip unit actuator. The logic device produces an output signal for controlling a trip unit actuator. In response to the plurality of input signals, the logic device provides an output signal indicative of a function performed on the signals for opening the circuit breaker contacts in an overcurrent condition.

20 Claims, 4 Drawing Sheets

| First signal (A) 106 | Second signal (B) 108 | Output signal 110 |
|---|---|---|
| 0 | 0 | 0 |
| 0 | 1 | 0 |
| 1 | 0 | 1 |
| 1 | 1 | 0 |

↖ 116

TRIP SIGNAL VERIFYING METHOD AND APPARATUS

BACKGROUND OF INVENTION

In electrical power distribution systems, circuit breakers have been used to terminate the flow of current in the event of a fault in the system. Traditionally, in circuit breaker applications, trip units have been thermally based or magnetically based, and perform well for their intended function, which will be appreciated by one of ordinary skill in the art. More recently, interest in microprocessor-based electronic trip units has grown. Circuit breaker trip units having microprocessor controls are being implemented in increasing numbers in power supply circuit breakers. These microprocessor-based trip units replace the traditional thermal and magnetic trip units to initiate automatic circuit interruption by the circuit breaker in response to electrical fault conditions. The popularity of microprocessor-based circuit breakers is largely due to their versatility. That is, a microprocessor-based trip unit provides convenient trip definition and setting adjustment that is precisely tailorable to a particular application.

Typically, a trip unit is mounted within a recess in a circuit breaker enclosure or housing. Current sensing devices within the circuit breaker sense current within the protected circuit. The sensed signal is directed to the trip unit. The trip unit analyzes the sensed signal for one or more indications of fault within the protected circuit. Such indications include: time-delayed-over-current, instantaneous-over-current, over-voltage, under-voltage, over-frequency, under-frequency, over-power, volt-to-current-mismatch, etc. The list of potential fault indications is extensive and within the purview of those skilled in the art to select and design for a given application. If the trip unit detects one of these fault indications, the trip unit provides a single trip signal to a trip actuator within the circuit breaker. The trip actuator actuates an operating mechanism that causes a pair of main current carrying contacts within the circuit breaker to open, thus stopping the flow of electrical current in the protected portion of the distribution circuit.

Typically, signals within a circuit breaker are susceptible to noise and may result in unwanted so-called "nuisance" tripping. Noise is unwanted voltage that is induced in electrical circuits and can present a threat to the proper operation of the circuit. Wires and other conductors within a system can pick up stray high-frequency electromagnetic radiation from adjacent conductors in which currents are changing rapidly or from many other sources external to the system. Also, power-line voltage fluctuation is a form of low-frequency noise.

A voltage surge or excessive noise could cause an erroneous signal generated from the microprocessor to propagate a false signal to the trip actuator, thus increasing the frequency of nuisance trips. Additionally, the outputs of a microcontroller may momentarily surge as a result of a power up or the outputs may go to an invalid state when the microprocessor is powering down or only partially powered, potentially causing a nuisance trip in these instances. Such nuisance trips cause unwanted delay and increase component wear unnecessarily. Unfortunately, an improper trip signal due to noise is not detected until a nuisance trip occurs.

SUMMARY OF INVENTION

The above discussed and other drawbacks and deficiencies are overcome or alleviated by the device and method for verifying a trip unit signal utilizing a trip unit comprising: a sensor for sensing a condition of a circuit providing electricity to a load; a signal converter for converting signals generated by the sensor into a digital value indicative of said condition; a microcontroller for processing the digital value and generating a first signal and a second signal in response to an overcurrent condition; and a logic device configured to process the first signal and second signal and generate a trip signal in response to the first signal and second signal.

DETAILED DESCRIPTION

Figure 1:
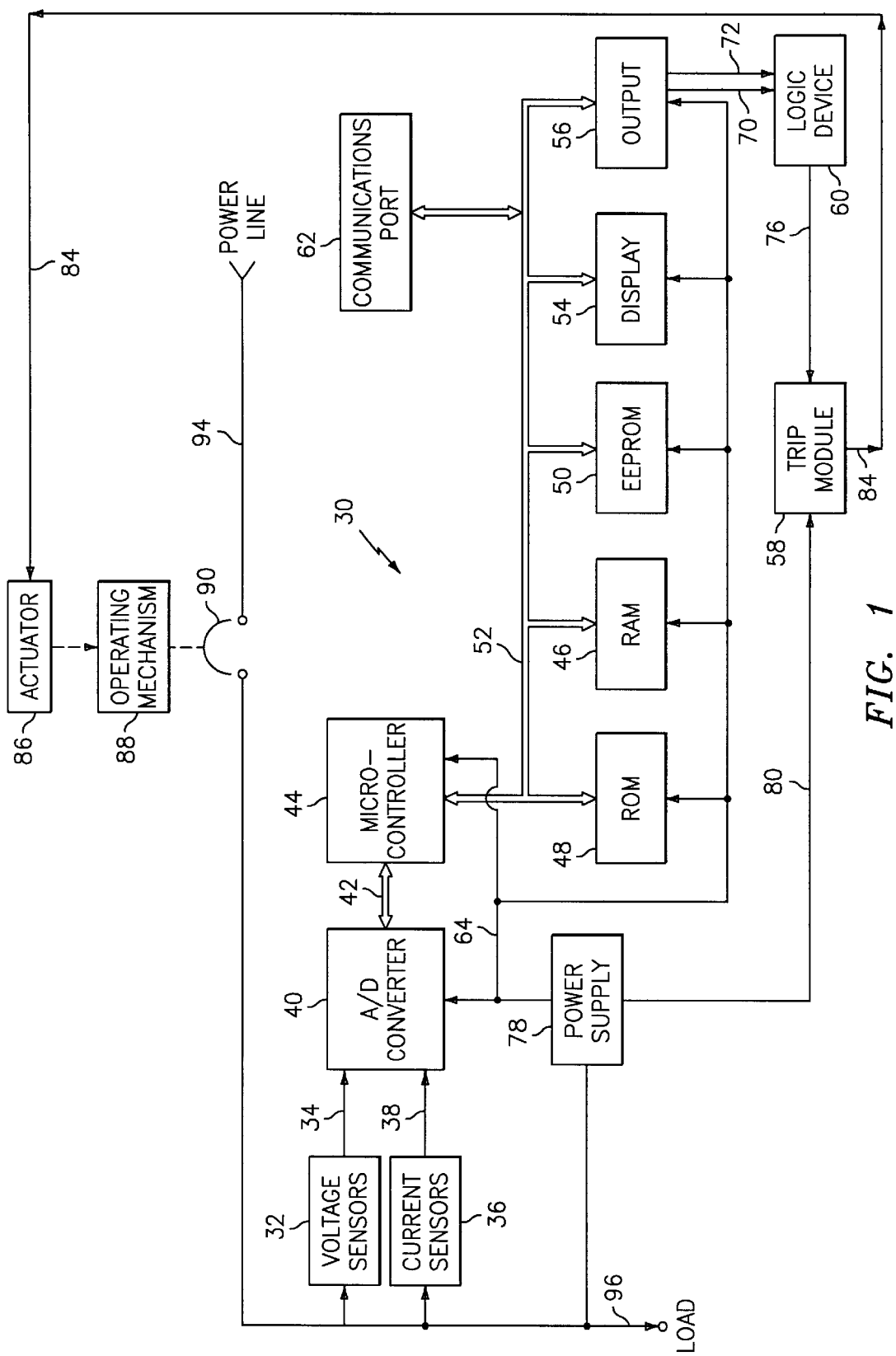
FIG. 1 is a schematic block diagram of an electronic trip unit and circuit breaker.

FIG. 1 is a schematic block diagram of an electronic trip unit and circuit breaker, the trip unit generally shown at 30. Trip unit 30 comprises a voltage sensor 32 which provides analog signals indicative of voltage measurements on a signal line 34 and a current sensor 36 which provides analog signals indicative of current measurements on a signal line 38. The analog signals on line 34 and 38 are presented to an A/D (analog/digital) converter 40, which converts these analog signals to digital signals. The digital signals are presented over a bus 42 to a microcontroller (signal processor) 44, such being commercially available from Texas Instruments (e.g., Texas Instruments" MSP430 type processor). Trip unit 30 further includes RAM (random access memory) 46, ROM (read only memory) 48 and EEPROM (electronic erasable programmable read only memory) 50 all of which communicate with the microcontroller 44 over a control bus 52. It will be appreciated that A/D converter 40, ROM 48, RAM 46, or any combination thereof, may be internal to microcontroller 44, as is well known. EEPROM 50 is non-volatile so that system information and programming will not be lost during a power interruption or outage. Data, typically status of the circuit breaker, is displayed by a display 54 in response to display signals received from microcontroller 44 over control bus 52. An output control device 56, in response to control signals received from microcontroller 44 over control bus 52, controls a trip module 58 via a logic device 60. Logic device 60 processes first and second signals 70, 72 generated from microcontroller 44 to verify an overcurrent condition, and generates a trip signal 76 to trip module 58 if an overcurrent condition is verified. Power supply 78 provides an actuation voltage 80 to trip module 58, which in turn generates an actuation signal 84 to an actuator 86, such as a solenoid that trips a mechanical operating mechanism 88. Operating mechanism 88 in turn opens the circuit breaker contacts 90 that provide an electrical connection between the power line 94 and the load 96.

Figures 2, 3:
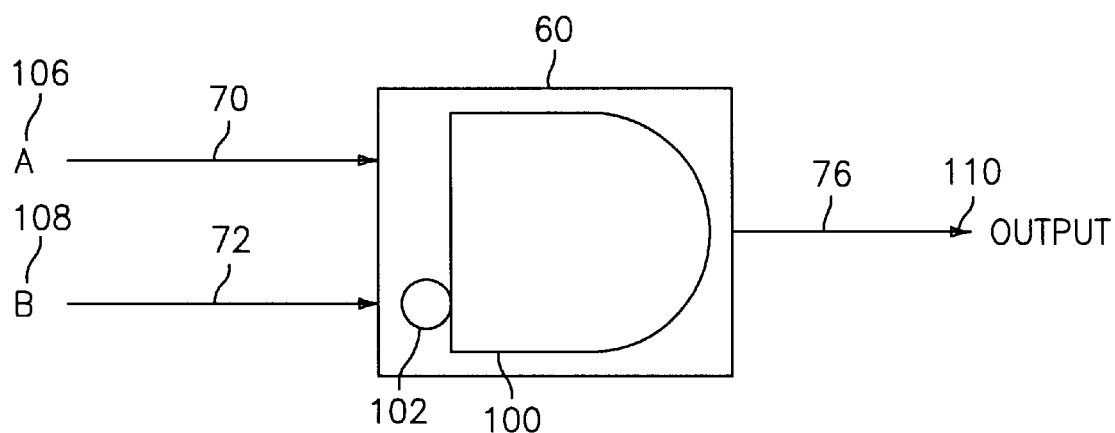
FIG. 2 is a simplified schematic representation of the logic device of FIG. 1.
FIG. 3 is a truth table of an exemplary embodiment of the logic device of FIG. 2.

Referring now to FIGS. 1 and 2, microcontroller 44 processes signals to determine whether an overcurrent condition exists. When an overcurrent condition exists, microcontroller 44 generates a first signal 70 and a second signal 72 received by logic device 60. Logic device 60 is optionally included within output control device 56, but is shown as a separate device for ease of explication. In an exemplary embodiment, logic device 60 comprises a logic AND gate 100 with an inverter 102 on one of the two inputs to the AND gate 100. Logic AND gate 100 has an input A 106 and an input B 108 with an inverter 102 on input B 108. Logic device 60 processes first signal 70 inputted to input A 106 and second signal 72 inputted to input B 108 to confirm that an overcurrent condition exists, as opposed to a power surge, spike or other nuisance-tripping occurrence. When microcontroller 44 generates a first signal 70 representing a digital logic high level and a second signal 72 representing a digital logic low level, logic device 60 generates an single output 110 that is a trip signal 76 received by trip module 58 to trip the circuit breaker by opening the contacts 90.

Referring to FIG. 3, a truth table 116 for the logic AND gate 100 having input A 106 and inverter 102 at input B with a single output 110 is shown. It should be noted that low logic levels are represented by a "0" and high logic levels are represented by a "1" in truth table 116. It will be recognized that various logic gate combinations are optionally utilized to obtain a similar truth table 116. Truth table 116 reveals that the output 110 is logic level high (i.e., "1") only when input A 106 (first signal 70) is a logic level high and input B 108 (second signal 72) is logic level low. When output 110 is a logic level high, a trip signal 76 is generated to the trip module 58 for tripping the circuit breaker contacts 90. In all other logic level combinations, the output 110 is a logic level low that does not provide a trip signal 76.

Having two signals 70, 72 at relatively opposite extremes of a logic level spectrum minimizes the opportunity for a trip signal being generated by a nuisance trip condition. More specifically, having one of first signal 70 and second signal 72 represent a logic low level in order to generate a trip signal limits the opportunity for a nuisance trip caused by a voltage surge. In the event of a voltage glitch, a logic low level signal would be absent due to the voltage glitch likely increasing any voltage level signals, thereby not providing a logic low level signal necessary to generate a trip signal 76 to open the circuit breaker.

Figure 4:
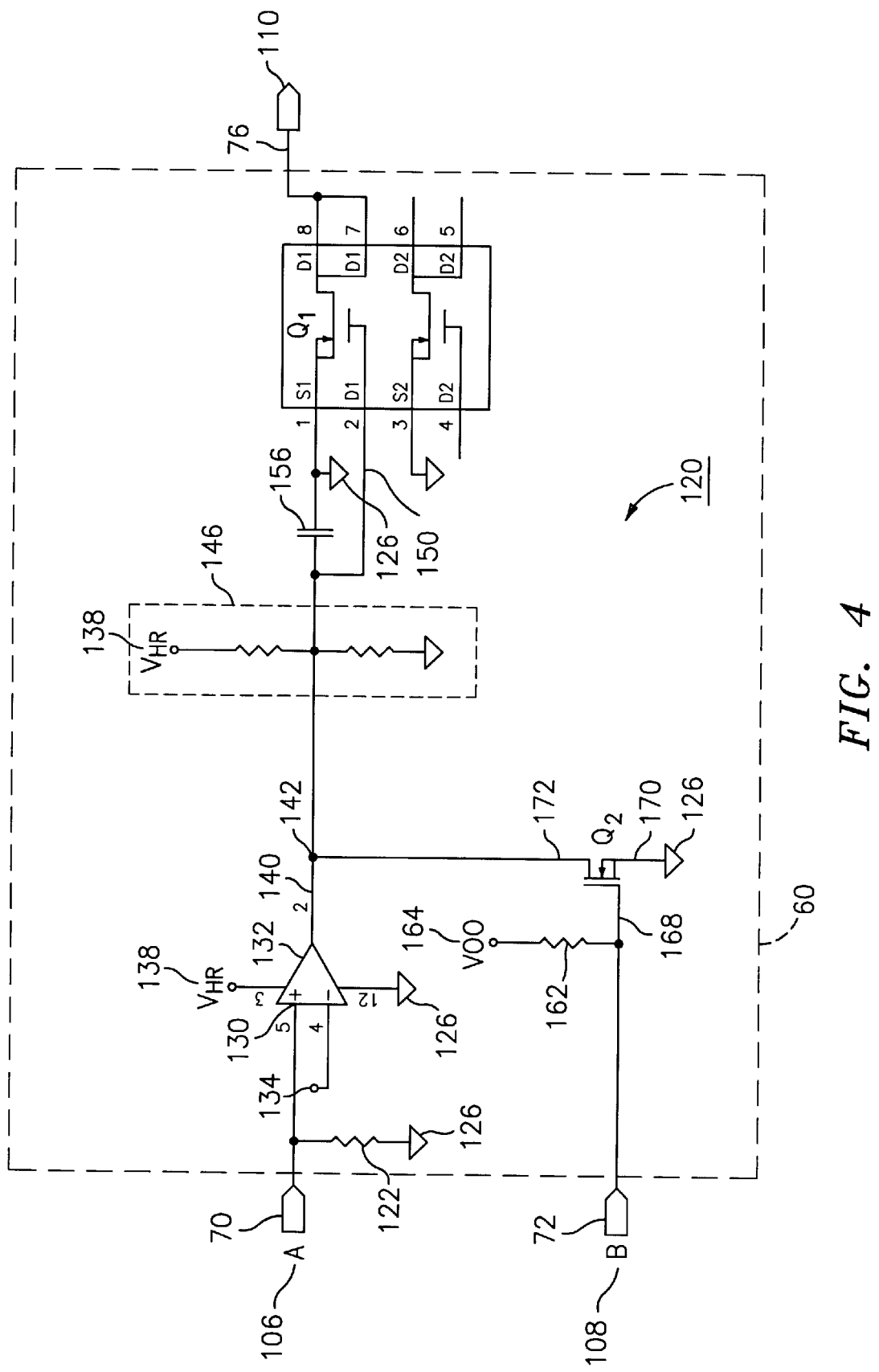
FIG. 4 is a schematic representation of an exemplary embodiment of a logic circuit for the logic device of FIGS. 1, 2 and 3.

Referring to FIG. 4, an exemplary embodiment of a logic circuit utilized in a logic device 60 is shown generally at 120 for processing first and second signals 70, 72 generated by microcontroller 44 to provide a trip signal 76 when an overcurrent condition is verified. A trip signal 76 is generated when a predetermined logic level combination of the first signal 70 and second signal 72 are inputs to the logic circuit 120. The logic circuit 120 includes the first designated input A 106 for first signal 70 and the second designated input B108 for second signal 72. Input A106 is in electrical communication with a pull down resistor 122 that is connected to a digital ground 126. Input A106 is also in electrical communication with a non-inverting input 130 of a voltage comparator 132. An inverting input 134 of comparator 132 is connected to a reference voltage of about +1.8 volts. Comparator 132 is further electrically connected to a power supply voltage ($V_{HR}$) 138 of about +7.5 to about +11.5 volts and electrically connected to digital ground 126. Comparator 132 has a single output 140 that is electrically connected to node 142. Node 142 is connected to a voltage divider 146 (shown within phantom lines) Voltage divider 146 is connected to a gate 150 of a transistor Q1 and also to a capacitor 156 that is in electrical communication with digital ground 126. A source 158 of transistor Q1 is also connected to digital ground while a drain 160 of transistor Q1 is the output 110 of logic circuit 120.

Input B108 is in electrical communication with a pull up resistor 162 that is connected to a power supply ($V_{DD}$) 164. $V_{DD}$ 164 is about +3.6 volts. Input B108 is also connected to a gate 168 of a transistor Q2 that has a source 170 connected to digital ground 126. Drain 172 of transistor Q2 is in electrical communication with the output 140 of comparator 132 at node 142.

Referring again to FIG. 4, operation of logic circuit 120 described above for verifying a proper trip condition can be described. An internal logic circuit associated within comparator 132 and the designated input A 106 acts as an opened or closed switch as is well known in the microprocessor art. The voltage comparator 132 is essentially an operational amplifier with two npn transistors added to the output of the amplifier. This arrangement produces an "open collector" output. The output is switched on or off depending on the relative voltages at the non-inverting input 130 and inverting input 134. The inputs are quite sensitive and a difference of only a few millivolts between the two inputs will cause the output to turn on or off. Current flows through the open collector when the voltage at the non-inverting input 130 is lower than the voltage at the inverting input 134. Current doesn't flow through the open collector when the voltage at the non-inverting input 130 is higher than the voltage at the inverting input 134. Specifically, the logic circuit is opened when the voltage at input A 106 is greater than or equal to +1.8 volts which is the reference voltage set at the inverting input 134 of comparator 132. The +1.8 volts may be obtained by a voltage divider at $V_{DD}$164, which is at +3.6 volts. The internal logic circuit is closed when the input voltage at input A is less than +1.8 volts indicating that the input A 106 is connected to electrical ground representing a logic low level, as described hereinafter.

When the microcontroller 44 detects an overcurrent condition, the microcontroller 44 produces two signals 70, 72 to initiate a trip. The two signals 70, 72 are inputs for the logic circuit 120. The two signals comprise a first signal 70 as an input A 106 to logic circuit 120 and a second signal 72 as an input B 108 to logic circuit 120. Each of the two signals 70, 72 represents either a digital logic high or digital logic low level, thus providing four different logic input combinations as explicated in FIG. 3. A true tripping condition is initiated when first signal 70 represents a digital logic high level and second signal 72 represents a digital logic low level when microcontroller 44 detects an overcurrent condition and initiates tripping with logic circuit 120 providing a logic high level output. The other three logic combinations provide a logic low level out put and do not initiate tripping.

When a true trip condition is detected, first signal 70 generated by microcontroller 44 is high voltage logic level and is input to the non-inverting input 130 of comparator 132. The comparator 132 converts the first signal 70 to a digital output (i.e., 1). The comparator 132 has an open-collector output stage, which requires a pull-up resistor of voltage divider 146 connected to the positive power supply $V_{HR}$ 138 for the output 140 to switch properly. When the internal output transistor (not shown) associated with the output 140 of comparator 132 is off, the output voltage will be pulled up to the positive voltage of voltage divider 146. More specifically, when the voltage at input A is larger than +1.8 volts, the output 140 will be a high impedance and the voltage applied to gate 150 will rise to the voltage level determined by voltage divider 146, thus turning Q1 on and providing a trip signal 76 in the absence of any kind of signal to input B. Input B 108 is low voltage logic level in a true trip condition, where low logic level voltage is about a digital ground level (e.g., 0 volts). When the voltage at gate 168 is low, Q2 is off and the voltage at the gate 150 of transistor Q1 rises to a voltage level determined by voltage divider 146 and turns Q1 on providing a trip signal 76.

The comparator 132 compares the input voltage (i.e., first signal 70 voltage level) at the non-inverting input 130 to the reference voltage at the inverting input 134. In an exemplary embodiment, the reference voltage is about +1.8 volts.

When the input voltage at input A 106 is less than +1.8 volts, representing a logic low level (i.e., 0), the output voltage at the output 140 is at digital ground. More specifically, the output 140 voltage is at the saturation voltage of the internal output transistor (not shown) associated with the output 140 of comparator 132, thus turning the internal transistor on and pulling the gate 150 of transistor Q1 to digital ground 126 or low logic level. It will be appreciated that it is irrelevant what input B 108 is when input A 106 is a logic low level (0), because gate 150 of Q1 is pulled low and thus, Q1 is off and cannot provide a trip signal 76.

Lastly, when input A 106 and input B 108 are both at logic high level voltages (i.e., 1), where high logic level voltage is about $V_{DD}$ 164 or about $V_{HR}$ 138, transistor Q2 is on and pulls the voltage at gate 150 of transistor Q1 to digital ground 126 or low logic level, and no trip signal 76 is provided.

It will be appreciated that the pull down resistor 122 at input A 106 pulls the first signal 70 low when the microcontroller 44 is not active, thereby pulling gate 150 low without a high level output 110 to initiate a trip. The pull up resistor 162 at input B 108 pulls the second signal 72 high when the microcontroller 44 is not active, thereby pulling gate 150 low without a high level output 110 to initiate a trip. Capacitor 156 is installed between a signal line (i.e., gate 150) and digital ground 126 for electromagnetic interference (EMI) or noise filtering. As the frequency becomes higher, the impedance of the capacitor 156 becomes lower, thus EMI (i.e., noise) is forced to go through the bypass capacitor 156 to ground 126. Lastly, the voltage of voltage divider 146 is preferably low enough to avoid excessive power dissipation yet high enough to supply enough drive to switch the transistor Q1 to drive the trip signal 76 to the trip module 58.

Figure 5:
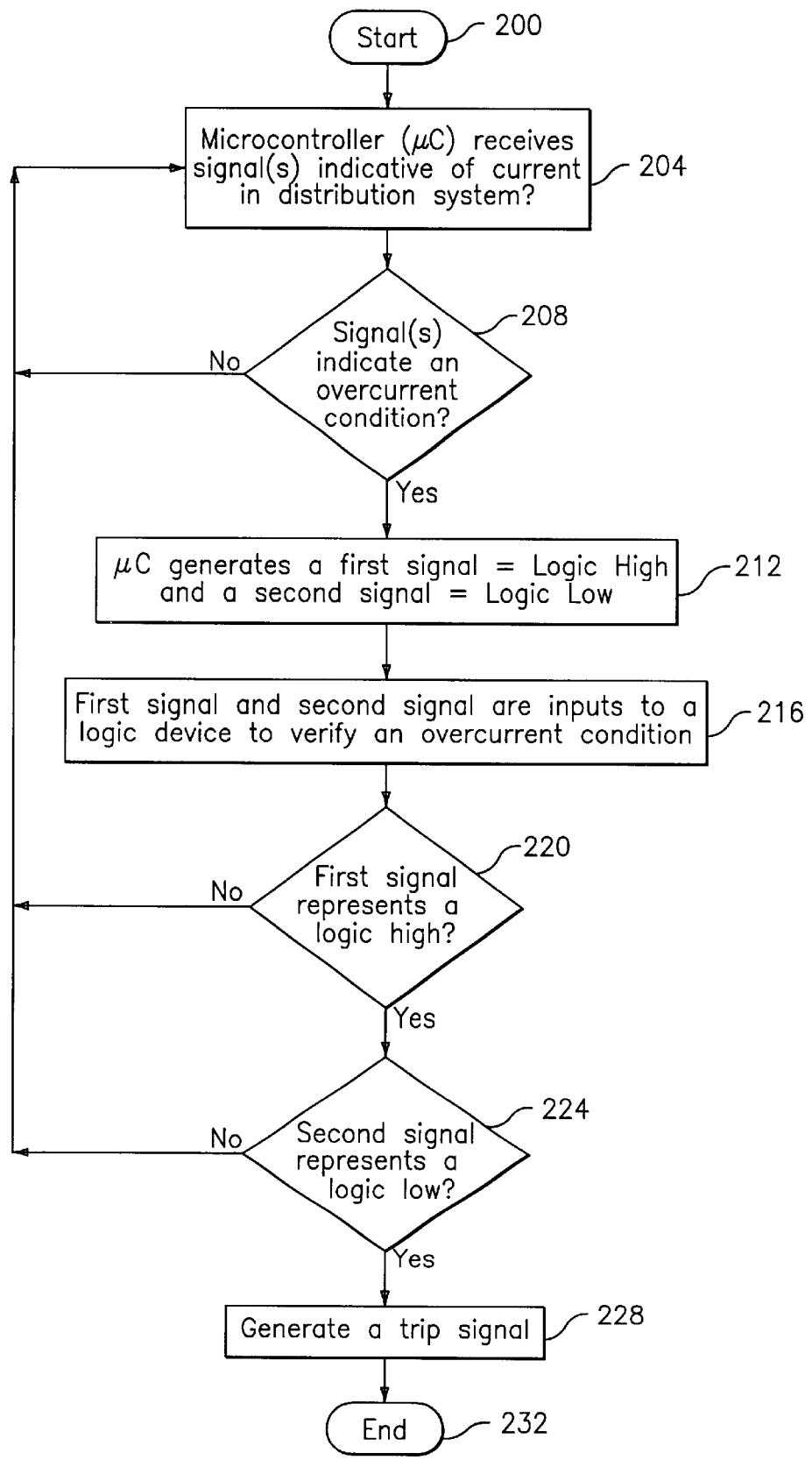
FIG. 5 is a flow chart representation of a method to minimize a nuisance trip condition.

Referring now to FIGS. 1 and 5, a method of the present disclosure is described. A method of minimizing the occurrence of nuisance tripping in a circuit breaker having a trip unit with a microcontroller is initiated preferably at start-up.

At start-up, block 200, the microcontroller initializes from the boot code and proceeds immediately to block 204. At start-up, a nuisance trip is more probable in the event of a power up surge. At block 204 the microcontroller 44 receives at least one signal indicative of the current in the power distribution system. The at least one signal is generated by voltage sensors 32 and current sensors 36 which in turn are converted to digital signals by A/D converter 40 for microcontroller 44 to process. At block 208, samples of sensed current which has been digitized and presented to the microcontroller (as described above) are compared to threshold levels set in the microcontroller. When a sample is above a predetermined threshold level indicating an overcurrent condition, proceed to block 212. If an overcurrent condition is not indicated go to block 204. At block 212 microcontroller 44 generates a first signal 70 equivalent to logic high and a second signal 72 equivalent to a logic low. First and second signal 70, 72 are inputs to a logic device 60, block 216, for verifying an overcurrent condition in the power distribution system and nullifying a possible nuisance tripping. Logic device 60 reads first signal 70, block 220, to see if it is logic high, if not, then continue to block 204. If logic device 60 reads first signal 70 as logic high, then block 224. At block 224, logic device 60 reads second signal 72 to check whether it represents a logic low, if not logic low, then block 204. If logic device reads second signal 72 as a logic low then logic device generates a trip signal 76, block 228, and then end at block 232.

The trip unit of the present invention insures a proper tripping condition by providing a plurality of input signals to a verifying logic device that is less susceptible to noise (unwanted voltage fluctuations) and provides an output signal to the trip module when a tripping condition properly occurs. Because verifying a proper trip signal in the trip unit is insured, the trip unit of the present invention will help to insure the correct operation of the circuit breaker and reduce the number of nuisance trips that the circuit breaker is subjected to.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A trip unit comprising:
   a sensor for sensing a condition of a circuit providing electricity to a load;
   a signal converter for converting signals generated by said sensor into a digital value indicative of said condition;
   a microcontroller configured to process said digital value;
   if an overcurrent condition is detected by said microcontroller, said microcontroller generates a first signal and a second signal in response to said overcurrent condition; and
   a logic device configured to process said first signal and said second signal and generate a trip signal if said first signal and said second signal are of different logic levels.

2. The trip unit according to claim 1 wherein said logic device comprises a logic circuit configured to verify said overcurrent condition by processing said first signal and said second signal.

3. The trip unit according to claim 1 wherein said logic device generates said trip signal when said first signal represents a first logic level and said second signal represents a second logic level opposite from said first logic level.

4. The trip unit according to claim 2 wherein said first signal is a digital logic high and said second signal is a digital logic low if said condition is an overcurrent condition.

5. The trip unit according to claim 1 wherein said logic device is a logic AND gate having an inverter at one of two inputs.

6. The trip unit according to claim 1 wherein said logic device limits the generation of said trip signal in response to a power surge by requiring one of said first signal and said second signal to represent a logic low level.

7. The trip unit according to claim 2 wherein said logic circuit comprises:

a comparator having a non-inverting input in communication with said first signal, an inverting input and an output;

a voltage divider connected to said output, a first gate of a first transistor and a second drain of a second transistor;

a second gate of said second transistor in communication with said second signal; and a first drain of said first transistor to generate said trip signal.

8. The trip unit according to claim 7 wherein said non-inverting input is connected to a pull down resistor.

9. The trip unit according to claim 7 wherein said second gate is connected to a pull up resistor.

10. The trip unit according to claim 7 wherein said first transistor further includes a first source connected to one end of a capacitor for reducing interference, said capacitor is connected to said voltage divider at an other end.

11. The trip unit according to claim 7 wherein said first transistor and said second transistor have sources connected to ground.

12. A circuit breaker comprising:

a set of contacts for making and breaking an electrical connection between an electrical load and an electrical power supply;

a trip unit operably connected to said contacts, said trip unit including
    a sensor for sensing a condition of a circuit providing electricity to said load;
    to a signal converter for converting signals generated by said sensor into a digital value indicative of said condition;
    a microcontroller for processing said digital value;
    if an overcurrent condition is detected by said microcontroller, said microcontroller generates a first signal and a second signal in response to said overcurrent condition; and
    a logic device configured to process said first signal arid said second signal and generate a trip signal if said first signal and said second signal are of different logic levels.

13. The circuit breaker according to claim 12 wherein said logic device comprises a logic circuit configured to verify said overcurrent condition by processing said first signal and said second signal.

14. The circuit breaker according to claim 13 wherein said logic device generates said trip signal when said first signal represents a first logic level and said second signal represents a second logic level opposite from said first logic levels.

15. The circuit breaker according to claim 13 wherein said first signal is a digital logic high and said second signal is a digital logic low if said condition is an overcurrent condition.

16. The circuit breaker according to claim 12 wherein said logic device is a logic AND gate having an inverter at one of two inputs.

17. The circuit breaker according to claim 12 wherein said logic device limits the generation of said trip signal in response to a power surge by requiring one of said first signal and said second signal to represent a logic low level.

18. A method of minimizing nuisance tripping in a circuit breaker having a trip unit, the method comprising;

detecting an overcurrent condition in a circuit providing electricity to a load;

if an overcurrent condition is detected, generating a first signal having a first digital value and a second signal having a different second digital value in response to said overcurrent condition; and generating a trip signal if said first digital value and said second digital value are of different logic levels.

19. The method of claim 18 wherein said trip signal is generated if said first digital value represents a logic high level and said second digital value represents a logic high level.

20. The method of claim 18 wherein said generating a trip signal includes:

inputting said first signal in a logic device;

inputting said second signal in said logic device;

determining a logic level for said first signal;

processing said second signal if said first level represents a logic high level;

determining a logic level for said second signal; and generating a trip signal if said first digital value represents a logic high level and said second digital value represents a logic low level.

* * * * *